United States Patent
Dawan

(10) Patent No.: US 12,368,007 B2
(45) Date of Patent: Jul. 22, 2025

(54) NANOTUBE FILM ENHANCED 3-D PHOTOANODE FOR DYE-SENSITIVE PHOTOVOLTAIC CELL

(71) Applicant: Fareed Dawan, Baton Rouge, LA (US)

(72) Inventor: Fareed Dawan, Baton Rouge, LA (US)

(73) Assignee: Southern University and A&M College, Baton Ruge, LA (US)

( * ) Notice: Subject to any disclaimer, the term of this patent is extended or adjusted under 35 U.S.C. 154(b) by 0 days.

(21) Appl. No.: 18/136,316

(22) Filed: Apr. 18, 2023

(65) Prior Publication Data

US 2024/0355555 A1   Oct. 24, 2024

(51) Int. Cl.
*H01G 9/20* (2006.01)
*H01G 9/00* (2006.01)

(52) U.S. Cl.
CPC .......... *H01G 9/209* (2013.01); *H01G 9/0029* (2013.01); *H01G 9/2045* (2013.01)

(58) Field of Classification Search
CPC .... H01G 9/209; H01G 9/0029; H01G 9/2045; H01G 9/2031; H01G 9/2059
See application file for complete search history.

(56) References Cited

U.S. PATENT DOCUMENTS

| | | | |
|---|---|---|---|
| 2008/0072958 A1* | 3/2008 | Dutta | H01L 31/0296 257/E31.13 |
| 2014/0124021 A1* | 5/2014 | Ladanov | H01G 9/2059 428/110 |
| 2014/0290746 A1* | 10/2014 | Tani | C07D 213/79 8/652 |
| 2016/0204368 A1* | 7/2016 | Kudo | H10K 39/10 136/246 |

OTHER PUBLICATIONS

H. Kmentova et al., "Photoelectrochemical and structural properties of TiO2 nanotubes and nanorods grown on FTO substrate: Comparative study between electrochemical anodization and hydrothermal method used for the nanostructures fabrication", Catalysis Today 287 (2017) 130-136 (Year: 2017).*

* cited by examiner

*Primary Examiner* — Angelo Trivisonno
(74) *Attorney, Agent, or Firm* — Law Offices of Patrick L Mixon, LLC; Patrick L Mixon

(57) ABSTRACT

The present invention teaches increasing the efficiency of a dye-sensitive solar cell by increasing the surface area of the DSSC photoanode. A thin film titanium oxide is deposited in trapezoidal shaped wells etched in the DSSC substrate. The thin-film titanium oxide is anodized to produce titanium oxide nanotubes on the inner surface of the trapezoidal shaped wells to further increase the surface area and incidence of light being temporarily trapped within the wells. A sensitized dye overlays the titanium oxide nanotubes to increase quantity of light absorbed by the titanium oxide nanotubes. A photoactive layer such as $Cs_2O$ may be deposited to enhance electron current contribution. A compatible transparent metal contact layer is deposited. This layer may be followed by a high-refractive index droplet over the well to act as a convex lens waveguide for incoming light. Electrical connections are then made to the frontside and backside metal contacts.

17 Claims, 12 Drawing Sheets

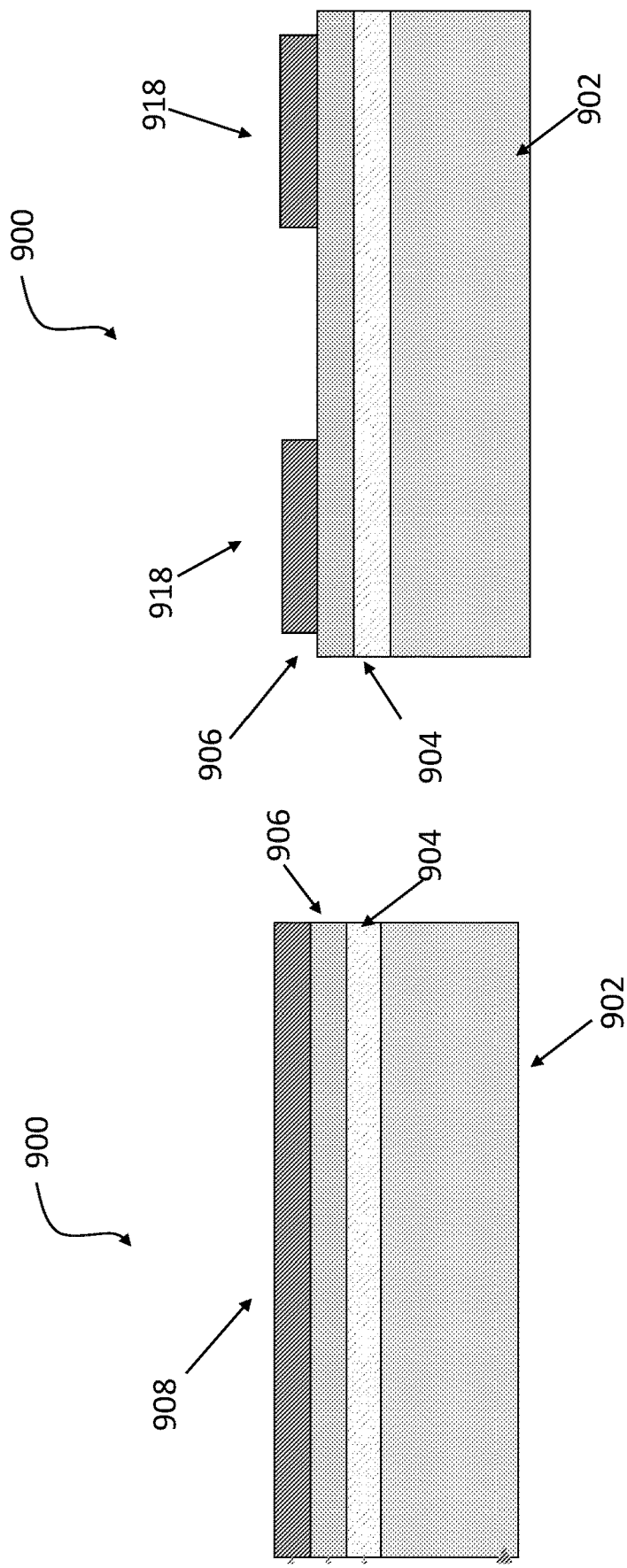

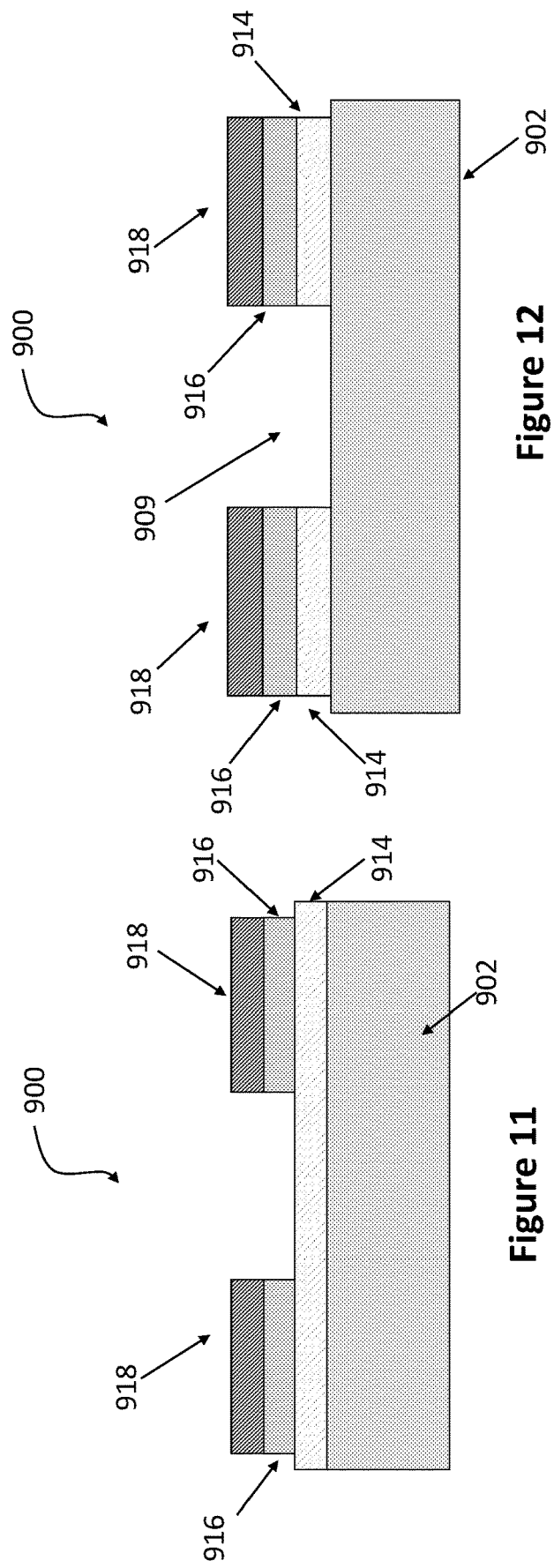

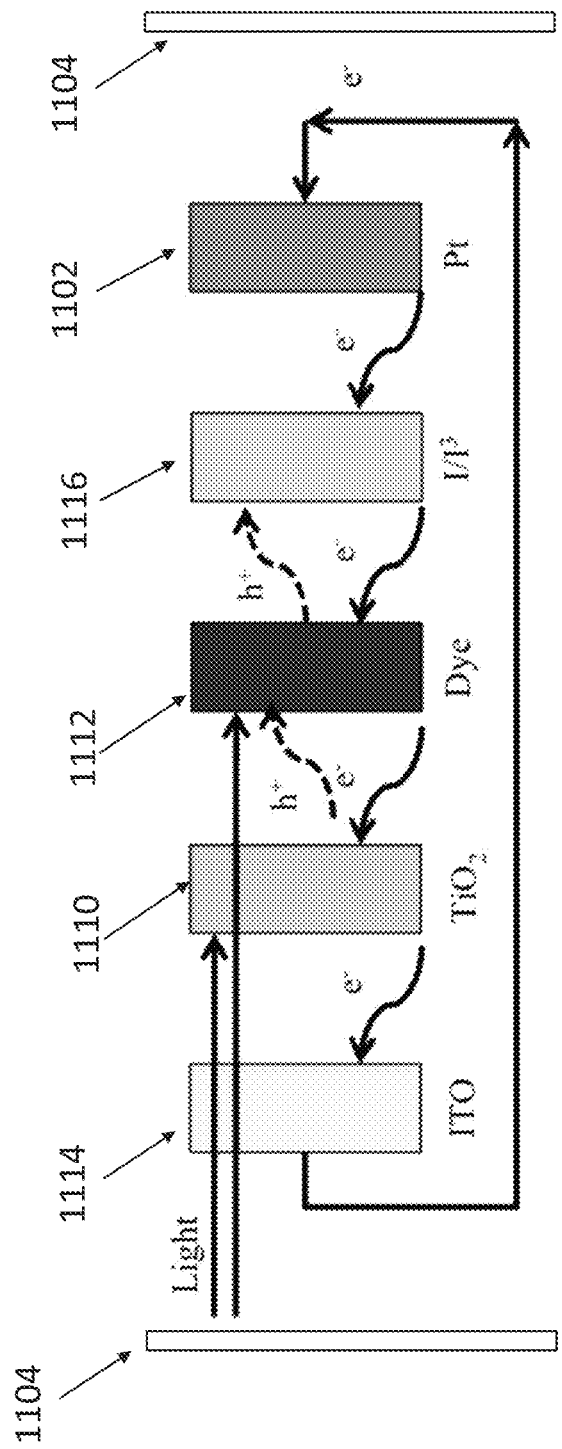
Figure 22- Prior Art

NANOTUBE FILM ENHANCED 3-D PHOTOANODE FOR DYE-SENSITIVE PHOTOVOLTAIC CELL

FIELD OF THE INVENTION

This invention relates to photovoltaic cells. More particularly, the present invention relates to photovoltaic cells such as dye-sensitive solar cells including hierarchical fabrication of $TiO_2$ nanotubes on non-planar 3-dimensional (3-D) microstructures for enhanced photovoltaic performance of the photoanode.

BACKGROUND OF THE INVENTION

The photovoltaic (PV) effect is a process that generates voltage or electric current in a photovoltaic cell when the cell is exposed to sunlight. The PV effect occurs when two dissimilar materials in close contact produce an electrical voltage as a result of being struck by light or other radiant energy. It is this dissimilarity in materials that causes electrons to move generating electric current.

The movement of the electrons can be seen at the atomic level, where electrons can be observed orbiting an atom's nucleus. The number and proximity of these electrons to the nucleus depend on the element being observed. A pure single element is composed of a periodic arrangement, or crystalline lattice, of an atom. The interaction between two or more different elements is an interaction between the electrons in the outer orbital of the two interacting atoms. The orbitals have energy levels. These energy levels are grouped in bands and are separated by gaps. The gaps are energy levels for which an electron cannot exist.

The energy band gap ($E_g$) of a material defines the amount of energy, measured in electron volts (eV), required to move an electron from the valence band (low energy state) to the conducting band (higher energy state), i.e., from a lower energy band to a higher energy band. A material's $E_g$ determines if the material is classified as a conductor, semiconductor or an insulator. Semiconductors have an $E_g$ that fall between an insulator and a conductor. The narrow proximity of the semiconductor's bands means that given an external energy such as heat and/or light, an electron can be excited from the valence band (i.e., lower energy level) to the conduction band (i.e., higher energy level), making many semiconductors ideal PV material.

In PV material, incident photon energy equal to the energy band gap is sufficient to excite an electron residing in the valence band ($E_v$) into the conduction band ($E_c$). Notably, electrons are negatively charged particles (denoted as e−). When these negatively charged particles are excited into the conduction band, it's positively charged particle counterpart (a hole, denoted as h+) is left behind and the excited electron is free to move about the atomic lattice. The excitation creates what is known as an electron– hole (e−-h+) pair.

The photovoltaic effect is the means by which dye-sensitive solar cells convert light into electricity. FIG. 22 is an illustration of a prior art DSSC cell electron generation and transfer process. The operation of DSSC cells is well known. As such, DSSC cell operation and transfer or electrons will only be generally discussed for brevity.

As shown, the functional layers producing the electricity in a DDSC are typically covered with transparent glass 1104 to help protect the functional layers against weather damage or damage resulting from handling. Typical functional layers of DSSC include photoanodes formed of a semiconductor material like, for example, silicon dioxide ($SiO_2$) which may include a thin film of titanium oxide ($TiO_2$) layer 1110 deposited on an indium titanium oxide (ITO) surface 1104. The $TiO_2$ may be further coated with a sensitizing dye 1112 for producing excited electrons to create an energy transfer for the $TiO_2$ layer 1110. The DSSC may further include an electrolyte 1116 for restoring the dye 1112 after oxidation of its molecules. Electrolyte 1116 provides electrons to the dye 1112 to fill the holes left behind when the electrons of dye 1112 are provided to the thin film $TiO_2$ layer 1110. In some instances, the electrolyte 1116 may contain a redox mediator in an organic matrix. Different types of mediators are used in the electrolytes, such as $I^-/I_3^-$, $SCN/(SCN)_2$, $S/S^{2-}$ and Co (II/III).[7] The most common mediator is the $I^-/I_3^-$ couple because of slow recombination rate of electron holes with injected electrons.

Incident sunlight is absorbed by the dye-coated titania photoanode (1110, 1112). The PV effect is centered on this photoanode (1110, 1112) where electron-hole (e-h) pairs are generated. The photon-excited dye 1112 ejects an electron into the $TiO_2$ photoanode (1110, 1112). Electrons flow through the $TiO_2$ photoanode (1110, 1112) into an adjacent metal contact (anode) (not shown) where it then flows towards a load. As noted, the electrolyte 1116 replaces these electrons ejected from the dye 1112. A cathode 1102, such as platinum (Pt) in-turn replaces these lost electrons in electrolyte 1116. This continuous electron transfer and replacement process produces a current flow within the DSSC cell.

The efficiency of the DSSC cell may be correlated to the surface area of the DSSC photoanode. As surface area increases, the amount of dye-coverage area also increases. This results in an increase in the generation of more e-h pairs.

Surface area has also emerged as a critical factor in the evolution of high-performance micro-electromechanical systems (MEMS) and multifunctional microstructures most of which will benefit from integrated on-chip solar power. Efficiency (n) of a solar cell is defined by the maximum power (Pm) over the product of the incident light intensity (E) and cell surface area (Ac).

$$n=Pm/(E \times Ac)$$

Fill Factor (FF) is also important. FF is defined as the ratio of the maximum obtainable power to the product of the open circuit voltage (Voc) and short circuit current (Isc).

$$FF=Pm/Voc \times Isc,$$

Where Pm=n×Ac×E.

Since the maximum power is directly related to surface area, any increase in surface area will have a direct increase on the maximum power, which then results in an increase in fill factor. As such, an increase in surface area increases overall DSSC cell efficiency by increasing dye-coverage area, fill factor, and maximum power output.

One approach to increasing the surface area and efficiency of silicon-based solar cells utilizes a surface texturing technique. The concept of controlled-surface-texturing is an extension of the process in the development of the Passivated-Emitter Rear Locally-Diffused (PERL) high efficiency silicon solar cell. The PERL cell utilized inverted pyramidal microwells, which effectively increased the absorption of incident light and significantly increased the performance of the silicon solar cell. It was reported that the 3-D textured surface increased the path length of absorbed light resulting in a conversion efficiency of only over 23%.

While a 23% increase is admirable, what is needed is a DSSC cell with increased surface area above that found in PERL silicon solar cell. Such an improvement may further improve the PV efficiency of the DSSC cell.

SUMMARY OF THE INVENTION

The present invention teaches improvements not found in the prior art. The invention uses titanium oxide nanotubes ($TiO_2$-NTs) deposited on 3-D surface-textured silicon to further increase the surface area and enhance light retention. The invention uses microfabrication techniques, to seamlessly integrate the DSSC onto microstructures to increase MEMS structures functionality.

The present invention uses photolithography to include 3-D structures in the surface of DSSC photoanode. The present invention teaches using KOH anisotropic etching of a 2-D pattern on <100> oriented silicon to form 3-D trapezoidal shape (i.e., 3-D etched microwells of trapezoidal shape). Titanium (Ti) thin-film may be deposited inside the 3-D trapezoidal shape, such that it conforms to the 3-D trapezoidal shape inner walls. The invention further teaches anodizing the Ti thin-film to form $TiO_2$ nanotubes within the 3-D etched microwells of the 3-D trapezoidal shape. The invention additionally teaches coating the $TiO_2$ nanotubes with dye-sensitizer to absorb incoming sunlight and produce excited electrons to create an energy which is then transferred to the titanium dioxide ($TiO_2$). Since areas of the anodized $TiO_2$ nanotubes exist in an amorphous state, the annealed the $TiO_2$ transforms the amorphous nanotube film into a highly crystalline anatase and rutile phase nanotube film.

The various embodiments of the invention in teach:
1. A photovoltaic cell including:
   a. a silicon micro-structure including 3 dimensional microwells;
   b. conformally-deposited $TiO_2$ nanotube film deposited within the 3 dimensional microwell; and
   c. a dye-sensitizer layer deposited on the $TiO_2$ nanotube film,
2. A photovoltaic cell according to 1 above, further including a high-refractive material layer overlaying at least one the 3-dimensional microwell.

In one aspect, the surface area of the 3-D silicon etched microwells (i.e., 3-D trapezoidal shape) is increased by the formation of $TiO_2$ nanotubes on the sidewalls of the microwells.

In one aspect, the invention teaches using conventional bulk micromachining to form trapezoidal shaped structures within the silicon substrate to improve the surface area of a DSSC.

In another aspect of the invention, the efficiency of the DSSC photoanode is improved by increasing the surface area of a sensitizing dye.

BRIEF DESCRIPTION OF DRAWINGS

A more complete understanding of the present invention may be derived by referring to the various embodiments of the invention taught in the detailed descriptions and drawings and figures in which like numerals denote like elements, and in which:

FIG. 9 is a depiction of an alternate embodiment of a surface etched DSSC photoanode according to exemplary embodiments of the present invention depicting a metal contact layer.

FIG. 10 is a depiction of an alternate DSSC photoanode according to exemplary embodiments of the present invention depicting the etching of the Silicon nitride layer.

FIG. 11 is a depiction of an alternate DSSC photoanode according to exemplary embodiments of the present invention depicting the etching of a metal contact layer.

FIG. 12 is a depiction of an alternate DSSC photoanode according to exemplary embodiments of the present invention depicting the etching of a chromium layer.

FIG. 22 is a depiction of a prior art DSSC.

DETAILED DESCRIPTION

This detailed description of exemplary embodiments of the invention herein refers to the accompanying drawings, which show the exemplary embodiments by way of illustration and its best mode. While these exemplary embodiments are described in enough detail to enable those skilled in the art to practice the invention, it should be understood that other embodiments may be realized, and that logical and mechanical changes may be made without departing from the spirit and scope of the invention. In addition, for the sake of brevity, conventional microfabrication, bulk etching, liquid etching, anodization and annealing processes used in the fabrication of solar cells may not be described in detail herein, for brevity. Further, as used herein, 3-D surfaces can be described as any lateral surface that extends into the vertical plane.

It should be noted that certain terms are used interchangeably herein, but not to limit the scope of the invention. For example, silicon substates may be referred to herein as silicon wafers. Similarly, where trapezoidal shaped profile shapes are described, such description may extend to any shape such as conical, hexagonal, and be referred to as wells or microwells. A "substrate" as used herein, refers to any substrate or material surface formed on a substrate upon which processing is performed. For example, a substrate surface on which processing can be performed include, but are not limited to, materials such as silicon, silicon oxide, strained silicon, silicon on insulator (SOI), carbon doped silicon oxides, silicon nitride, doped silicon, germanium, gallium arsenide, glass, sapphire, and any other materials such as metals, metal nitrides, metal alloys, and other conductive materials, depending on the application. Substrates include, without limitation, semiconductor wafers and flexible polymeric materials. Substrates may be exposed to a pretreatment process to polish, etch, reduce, oxidize, hydroxylate (or otherwise generate or graft target chemical moieties to impart chemical functionality), anneal and/or bake the substrate surface. In addition to processing directly on the surface of the substrate itself, in the present disclosure, any of the film processing steps disclosed may also be performed on a layer formed on the substrate as disclosed in more detail below, and the term "substrate surface" is intended to include such layer as the context indicates.

The present invention uses photolithography to selectively pattern photosensitive polymers (photoresists) that are coated onto the surface of a silicon nitride substrate. The photoresist of the present invention can either be a temporary chemical resistive layer for bulk micromachining via substrate etching or can be a final permanent component of a microdevice.

Figure 1:
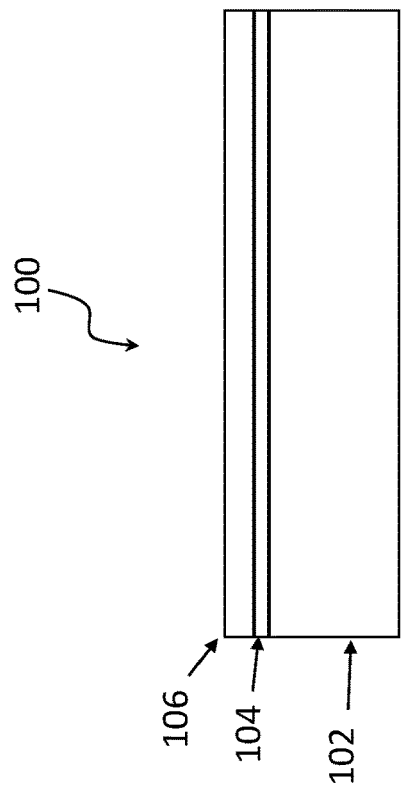
FIG. 1 is a depiction of DSSC photoanode according to exemplary embodiments of the present invention depicting the photoanode layered elements.

With reference to FIG. 1, what is shown is a silicon nitride wafer 102 that serves as the substrate for a DSSC photoanode 100 according to various embodiments of the present invention. Silicon nitride wafer 102 may be coated with a photoresist 104. A photomask 106 may be applied overlaying the photoresist 104.

Figure 2:
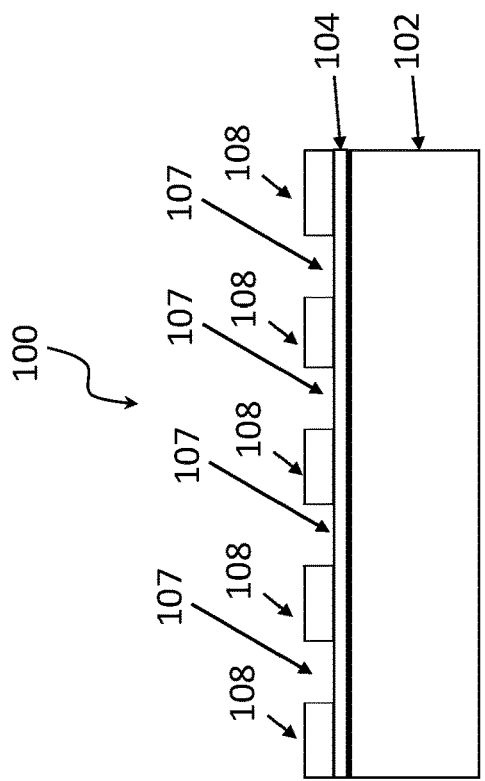
FIG. 2 is a depiction of a DSSC photoanode according to exemplary embodiments of the present invention wherein a photomask is exposed to UV light to produce a hardened photoresist in a photoresist pattern.

As shown in FIG. 2, photomask 106 may be exposed to UV light which hardens photoresist 104 into a resist pattern 108. In an exemplary embodiment, silicon nitride wafer 102 may be a (p-type, <100>) silicon wafer. Photoresist 104 may be a SPR 220 7.0 positive photoresist (Rohm and Haas). Silicon nitride wafer 102 may be spin-coated with the SPR 220 7.0 positive photoresist (Rohm and Haas) using a light-duty photoresist spinner.

In one exemplary embodiment, silicon wafer 102 may be baked on a hotplate and UV exposed in mask contact mode using photomask 106. In another exemplary embodiment, photomask 106 may be an optical photomask. In one example of the pattern that may be used, photomask 106 may be patterned with 1 cm×1 cm areas of arrays of circles and squares of varying dimensions (ie. photomask pattern 108) ranging from 5 to 20 µm, which, as is well known, results in exposed areas of silicon nitride wafer 107. The exposed areas of silicon nitride wafer 107 may then be post-exposed baked and developed to produce the resist patterns 108. For example, exposed areas of silicon nitride wafer 107 may be post-exposed baked and developed in, for example, a positive photoresist 106 to produce the resist patterns 108. A suitable positive photoresist developer useful with the present invention is MF-319 Developer (Shipley).

Figure 3:
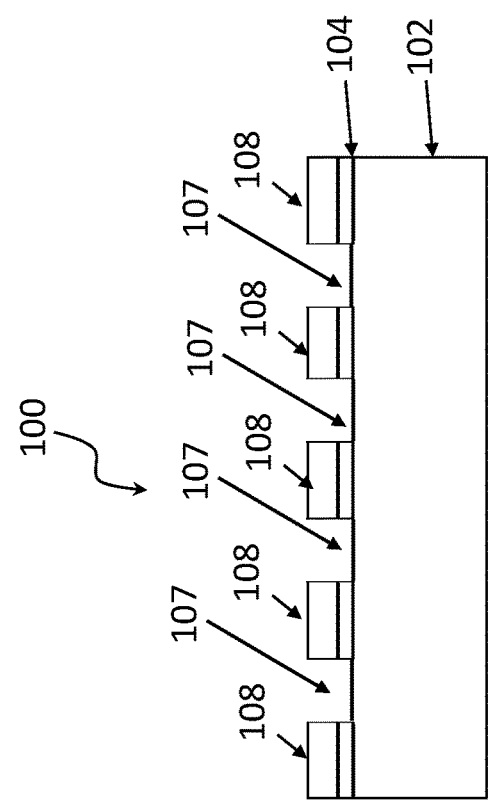
FIG. 3 is a depiction of a DSSC photoanode according to exemplary embodiments of the present invention wherein exposed areas of silicon nitride wafer subjected to selective surface etching.

As shown in FIG. 3, exposed areas of silicon nitride wafer 107 may then be subjected to selective surface etching. First, a resist hard-bake step may be done to render the photoresist 106 harder to remove during the surface etching process. In one embodiment, exposed areas of silicon nitride wafer 107 may be surface etched using a 10:1 $H_2O$:HF buffered oxide etchant (BOE) or reactive ion etching (RIE in the case for silicon nitride films).

Figure 4:
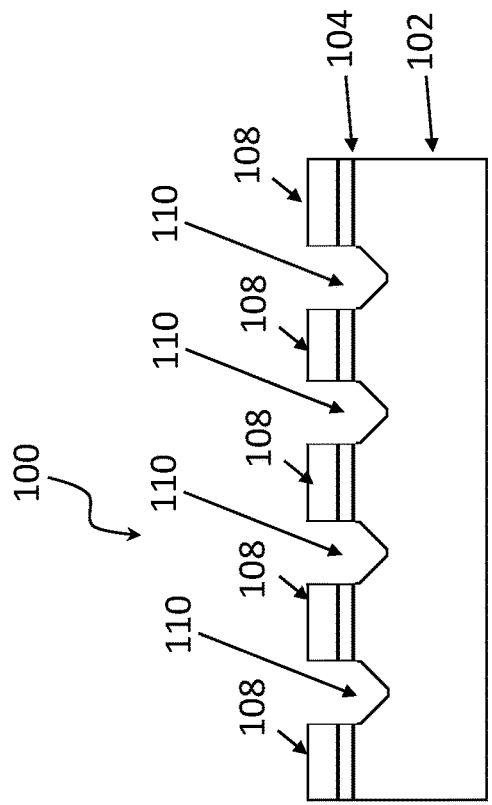
FIG. 4 is a depiction of a DSSC photoanode according to exemplary embodiments of the present invention wherein the exposed areas of silicon nitride wafer is 3-D surface-textured.

FIG. 4 depicts 3-D surface-texturing of the exposed areas of silicon wafer 107. As shown, the surface-texturing may result in a trapezoidal profile shape 110 etched in silicon wafer 102. In a preferred embodiment the trapezoidal profile shape 110 provides a suitable inclination of the sidewalls for nearly conformal-like coating of subsequent thin-film coatings. In one embodiment, the inclination of the sidewalls inclines at 55 degrees. In one embodiment, the inclination of the trapezoidal profile shape 110 sidewalls may be 54.7 degrees. In yet another embodiment, the inclination of the sidewalls inclines at 54 degrees. After surface etching, the DSSC 100 may be rinsed in an ultrasonic bath of warm de-ionized water.

The trapezoidal profile shape 110 is attainable via anisotropic wet etching of <100> silicon. Trapezoidal profile shape 110 is also ideal in that it (and its multi-sided variations) is a shape obtainable from KOH anisotropic etching any 2-D pattern on <100> oriented silicon. Here, the smallest lateral area feature was 10 µm² with pitch variation between array elements ranging from no pitch to 10 µm. The depth reached at most was 15 µm. These shapes are similar to the inverted pyramidal surface-texturing technique utilized in the high-efficiency Si-based PERL solar cell. In one particular embodiment, the etching solution may be 30% KOH in de-ionized water at 65° C. The etching time may depend on the pattern dimensions and may range from 5 min to 30 min etching time.

Figure 5:
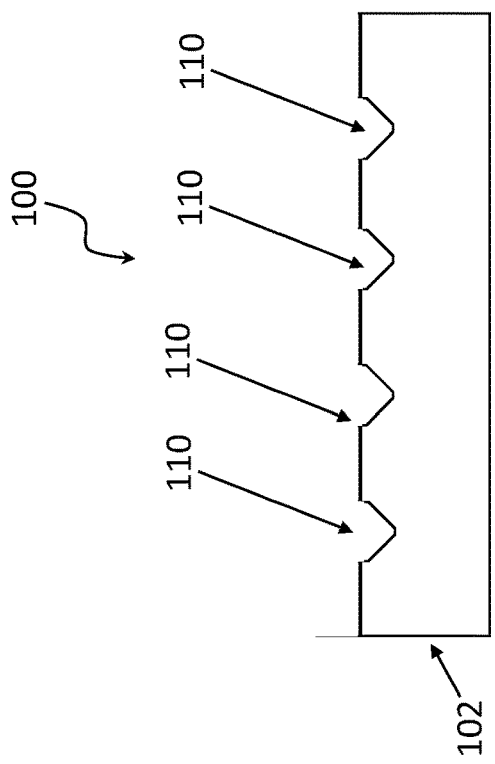
FIG. 5 is a depiction of a DSSC photoanode according to exemplary embodiments of the present invention wherein a second BOE/RIE step is performed to remove any excess silicon nitride.

As seen in FIG. 5, in another particular embodiment, a second BOE/RIE step may be performed to remove any excess silicon dioxide on DSSC 100. For example, DSSC 100 may be cleaned of excess silicon dioxide by rinsing with acetone, followed by IPA, and de-ionized water then dried with nitrogen and dehydrated in a convection oven. In a specific example, DSSC 100 may be cleaned of excess silicon dioxide by rinsing with acetone, followed by IPA, and de-ionized water then dried with nitrogen and dehydrated in a convection oven at 100° C. for 2 hours.

Figure 6:
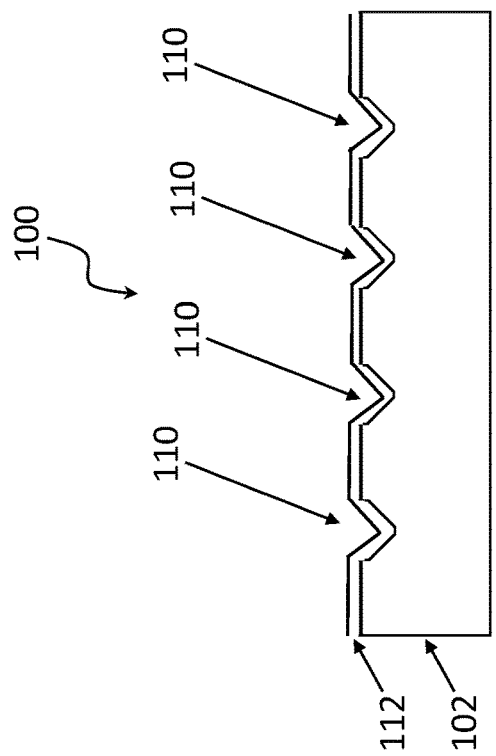
FIG. 6 is a depiction of a DSSC photoanode according to exemplary embodiments of the present invention thin-film titanium is conformally-deposited on a trapezoidal profile shape etched in the silicon substrate.

As shown in FIG. 6, a thin-film titanium 112 may be conformally-deposited within the trapezoidal profile shape 110. By "conformally-deposited" what is meant is that the thin-film titanium overlays at least the sidewalls of trapezoidal profile shape 110. In one particular embodiment, thin-film titanium 113 may be deposited on the sidewalls of trapezoidal profile shape 110 using evaporative deposition. In another exemplary embodiment, thin-film titanium 112 may be deposited on the sidewalls of trapezoidal profile shape 110 using sputtering deposition. For example, the thin-film titanium 112 may be sputter deposited via DC magnetron sputtering. The varied sputtering parameters may have a DC power of 120 W, 160 W, and 180 W all under a working pressure of 1 mhorr, with Argon as the carrier gas at a flow rate of 20-30 sccm. Typically, deposition via sputtering results in amorphous titanium, and subsequently amorphous titania due to the formation of the native oxide once removed from the sputtering chamber.

It is well known that titanium (Ti) has a hexagonal close packed (hcp) crystal lattice structure with a lattice constant of 2.95 Å. Ti readily and naturally oxidizes when exposed to air forming a 1-2 nm thick titanium dioxide ($TiO_2$) passivation layer, such as, thin-film $TiO_2$ layer. Consequently, one skilled in the art will understand that the thin-film layer of titanium 112 readily interacts with oxygen to form $TiO_2$. Thus, $TiO_2$ 112, shown in FIG. 6, represents the oxidized thin-film titanium 112.

Figure 7:
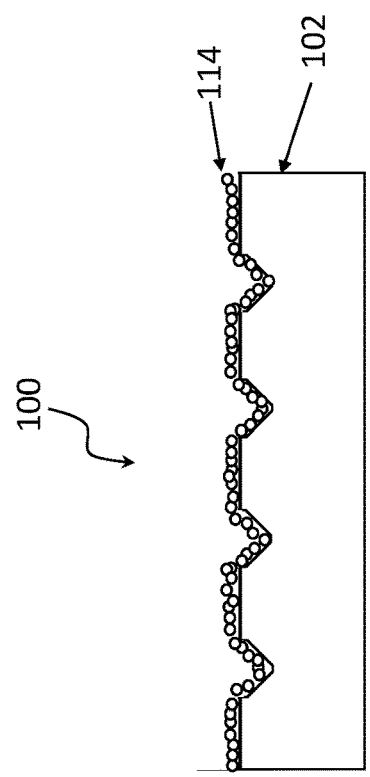
FIG. 7 is a depiction of a DSSC photoanode according to exemplary embodiments of the present invention wherein the anodization of the thin-film titanium layer into high-surface area produces $TiO_2$ nanotubes on the sidewalls of the trapezoidal profile shape.

The resulting $TiO_2$ film is an n-type semiconductor. Among many ways to oxidize Ti, anodization via an electrolytic solution is a relatively easy and controlled way to form $TiO_2$. It has also been found that anodizing Ti forms high-surface area $TiO_2$ nanotubes oriented perpendicular to the surface of titanium. This formation of $TiO_2$ nanotubes occurs through a process known as pitting corrosion, an oxidation-reduction (redox) process. In accordance with the present invention, FIG. 7 thin-film $TiO_2$ layer 112 is depicted anodized into high-surface area $TiO_2$ nanotubes oriented perpendicular to sidewalls of trapezoidal profile shape 110.

The anodized $TiO_2$ exists in an amorphous crystalline state. The crystalline state is present in mainly three phases: brookite, anatase, and rutile. The brookite phase is an unstable phase and is rarely present, whereas the metastable (unstable and transient energy state) anatase and stable rutile phases are more common. These two phases are applicable to photovoltaics as they both have photocatalytic properties. As with photovoltaic material, photocatalytic material produces e-h pairs under illumination. It has been reported that the anatase phase of $TiO_2$ has improved photocatalytic performance due to its higher surface area and smaller microstructure grain size compared to the rutile phase. This higher surface area provides more sites for the generation of e-h pairs. The smaller grain size increases the probability of electron and hole trapping which reduces e-h pair recombination. The band gap energy required to generate an e-h pair in anatase $TiO_2$ is 3.2 eV (about 380 nm), and is 3.02 eV (300 nm) for rutile. Altering the phase of $TiO_2$ can be achieved chemically or thermally through an annealing process.

Annealing is a type of heat treatment that can alter the phase and/or microstructure of a metal. For example, annealing transforms amorphous $TiO_2$ into anatase $TiO_2$ between temperatures of 200 and 500° C. at atmospheric pressure (1 atm). Rutile $TiO_2$ is achieved at temperatures greater than 500° C. Typically, a pure phase of $TiO_2$ is not present and instead the material consists of a mixture (anatase and rutile) of phases.

The amorphous $TiO_2$ anodized films may be annealed to transform the amorphous nanotube film of the present invention into a highly crystalline anatase and rutile phase nanotube film. For example, in one embodiment, annealing may be performed in ambient (1 atm) conditions at 450° C. using a high-temperature oven (Thermolyne).

Figure 8:
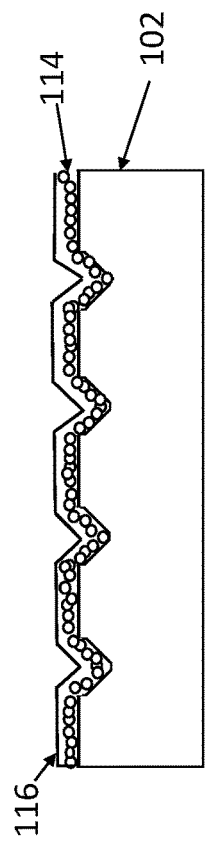
FIG. 8 is a depiction of a DSSC photoanode according to exemplary embodiments of the present invention depicting a top contact anode, such as, for example, indium tin oxide (ITO), deposited on the sensitizing dye.

It is well known that an organic dye may be added to a DSSC photoanode to absorb incoming sunlight and produce excited electrons for creating an energy which is then transferred to $TiO_2$. As such, FIG. 8 shows that a dye-sensitizer 116 may be coated on $TiO_2$ nanotubes 114 of the present invention for increasing the light absorption sensitivity of the DSSC 100. Dye-sensitizer 116 enhances the photo absorption wavelength of the UV sensitive $TiO_2$ nanotubes 114. In one embodiment, the thickness of the dye-sensitizer layer on the $TiO_2$ nanotubes 114 may be 20 nm which is sufficient for the ejected electrons to avoid recombination and allow transfer from the dye-sensitizer 116 into the $TiO_2$ nanotubes 114. Suitable dyes that are useful with this invention include N3, N179, and Black Dye.

FIGS. 9-21 depict exemplary embodiments of the $TiO_2$ nanotube enhanced DSSCs shown use in semiconductor microstructures according to the present invention. As shown in FIG. 9, a DSSC 900 may include a silicon dioxide substrate 902. Silicon dioxide substrate 902 may be of similar construction as is described with substrate 102. Silicon dioxide substrate 902 may be overlayed with a seed layer 904 for forming a metal contact layer 906 thereon. For example, seed layer 904 may be comprised of a chromium seed layer. Chromium seed layer 906 may further serve as a transparent electrode with good conductivity between silicon dioxide layer 902 and metal contact layer 906.

It is well known that a chromium seed layer allows for the adhesion of an ultrathin gold (Au) film. As such, the present invention takes advantage of this characteristic of chromium seed layer 905 to adhere a AU deposited metal contact layer 906. DSSC 900 may further include an anti-deflective layer 908 deposited on AU deposited metal contact layer 906 to minimize the reflection loss of light incident on DSSC 900 to increase the efficiency of the solar cell. In one particular embodiment, anti-deflective layer 908 may be silicon nitride ($SiN_x$) film deposited on AU metal contact layer 906. The $SiN_x$ anti-deflective layer 908 may be grown on AU metal contact layer 906 using, for example, plasma-enhanced chemical-vapor deposition.

As shown FIG. 10, SiNx anti-deflective layer 908 (also called, resistive layer 908) may be selectively etched to form a resistive pattern 918 overlaying chrome seed layer 906. In one embodiment, selective etching of the SiNx anti-deflective layer 908 may be accomplished using 85% $H_3PO_4$ at 180-150° C. in silicon ULSI processes. FIG. 11 depicts Au metal contact layer 906 selectively etched according to resistive patterns 918. The patterning of gold thin films, such as, Au metal contact layer 906, to form functional microstructures 916 can be performed using various 'additive' and 'subtractive' fabrication methods. Examples of the former include 'lift-off' techniques and through-mask plating. Subtractive methods can be broadly classified as either wet or dry etching methods. As is well known, in these etching techniques, the metal film is covered with a lithographically patterned mask material and then exposed to a liquid or gas-phase etchant.

As shown in FIG. 12, shows chromium seed layer 904 having been etched into a chromium seed layer pattern 914 according to the pattern of resistive pattern 918. Although the present invention discusses chromium seed layer 904, the invention contemplates using any suitable chromium containing film which may be etched into selectively etched chromium film pattern 914. Further, it is well known by one skilled in the art that the deposition of a chromium-containing film may be done using a selected chromium precursor, and a reductant (chromium metal), an oxidant source (chromium oxide), nitrogen source (chromium nitride), a carbon source (chromium carbide), a silicon source (chromium silicide), a boron source (chromium boride), and/or other metal source (e.g., titanium, tungsten, ruthenium, tin). The deposition process of some embodiments is an ALD process. In some embodiments, the deposition process is a chemical vapor deposition (CVD) process. Further still, the etching of the present invention can be done by any conventional selective etching method such as, dry etching. Selective etching of the chromium seed layer 904 provides exposed areas of silicon dioxide substrate 909.

Figure 13:
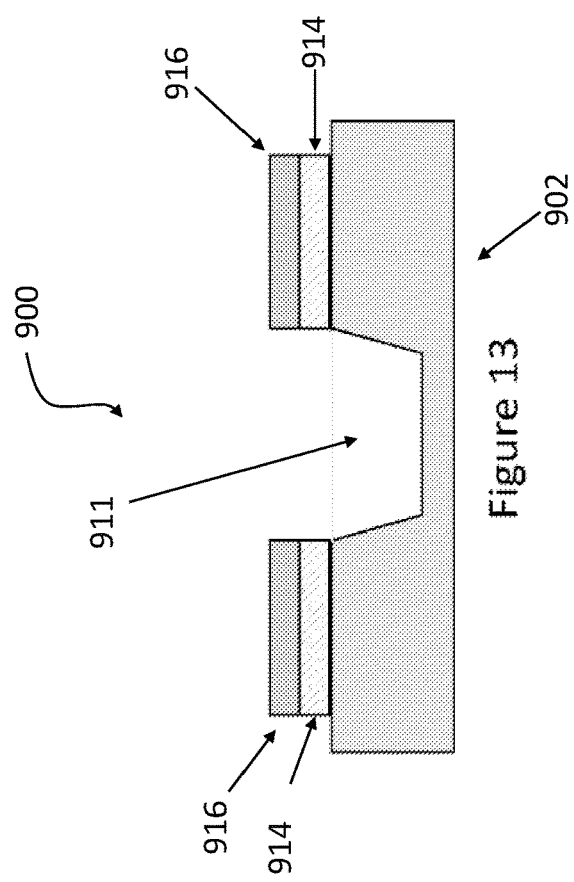
FIG. 13 is a depiction of an alternate DSSC photoanode according to exemplary embodiments of the present invention showing selective etching of the silicon substrate to produce trapezoidal profile shaped microwells within the substrate.

As previously noted, the resistive pattern 918 may be removed during processing. For example, resistive patten 918 may be removed by using a 10:1 $H_2O$:HF buffered oxide etchant (BOE) or reactive ion etching (RIE in the case for silicon nitride films), as previously discussed. FIG. 13 depicts DSSC with the resistive pattern 918 removed according to various embodiments of the invention. FIG. 13 further depicts an exemplary embodiment of the present invention wherein DCCS 900 has been subjected to 3-D surface-texturing of the exposed areas of silicon dioxide substrate 909. As shown, the surface-texturing may result in a trapezoidal profile shape 911 etched in silicon dioxide substrate 902. In a preferred embodiment the trapezoidal profile shape 911 provides a suitable inclination of the sidewalls for nearly conformal-like coating of subsequent thin-film coatings. Formation of trapezoidal profile shape 911 may be done in similar manner as was discussed with reference to trapezoidal profile shape 110.

Figure 14:
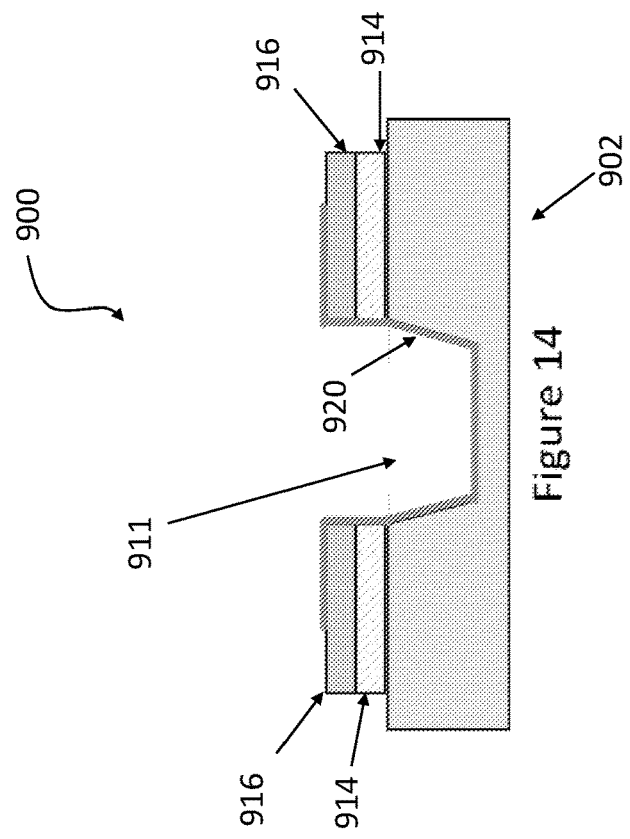
FIG. 14 is a depiction of an alternate embodiment of a surface etched DSSC photoanode according to exemplary embodiments of the present invention depicting a thin layer of Titanium deposited on the silicon substrate surface, wherein the thin Titanium film is conformally coated within a trapezoidal profile shape.

FIG. 14 depicts DSSC 900 including a deposition of thin-film titanium 920 within trapezoidal shape 911. In an exemplary embodiment, thin-film titanium 920 may be conformally-deposited within the trapezoidal profile shape 911 in similar manner as was discussed with respect to thin-film titanium 113. As also previously noted, thin-film titanium readily forms titanium oxide when exposed to oxygen. As such, thin-film titanium and thin-film titanium oxide may be used interchangeably, herein. Similar to what is discussed with reference to thin-film titanium oxide layer 112, thin-film titanium oxide layer 920 may be anodizing to form high-surface area $TiO_2$ nanotubes 922 (Shown in FIG. 15) within trapezoidal profile shape 911. The anodized $TiO_2$ nanotubes 922 may be further annealed to transform the anodized $TiO_2$ nanotubes into a highly crystalline anatase and rutile phase nanotube film.

Figure 16:
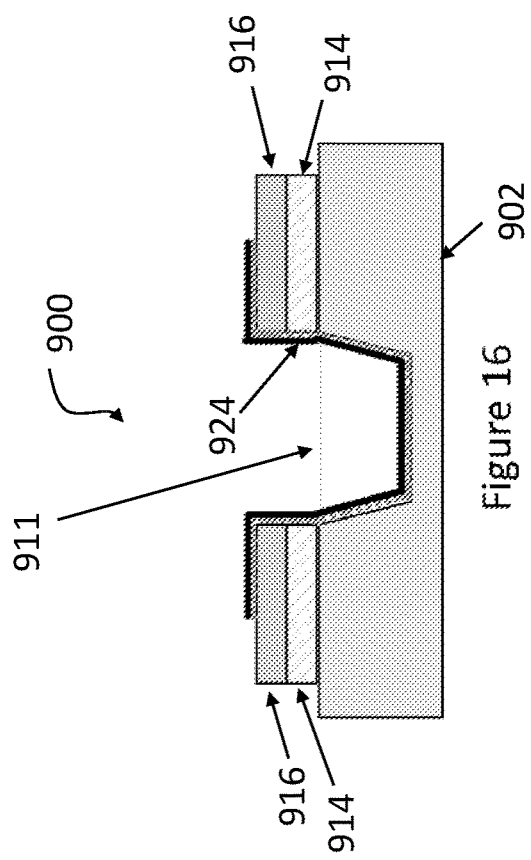
FIG. 16 is a depiction of yet alternate embodiment of a surface etched DSSC photoanode according to exemplary embodiments of the present invention, depicting sensitizing dye deposited onto the $TiO_2$ nanotubes.
Figure 15:
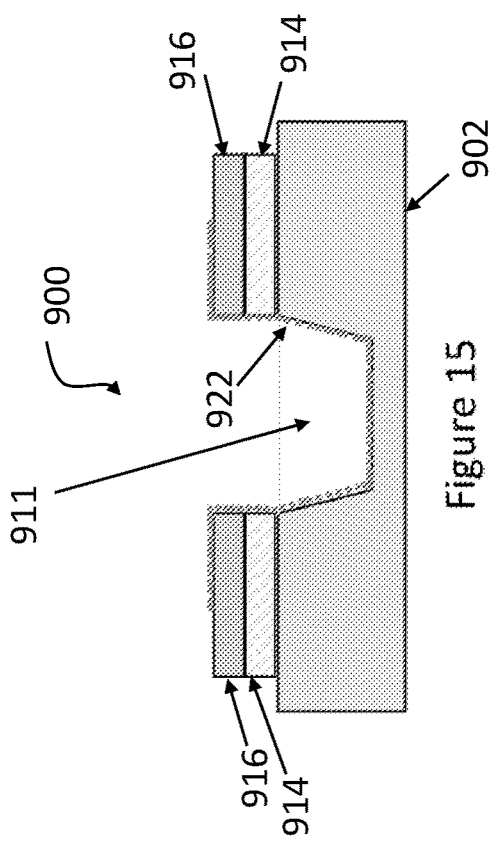
FIG. 15 is a depiction of an alternate embodiment of a surface etched DSSC photoanode according to exemplary embodiments of the present invention depicting anodization of the titanium layer into a thin layer of $TiO_2$ nanotubes.

As shown in FIG. 16, a dye-sensitizer layer 924 may be coated on $TiO_2$ nanotubes 922 of the present invention for increasing the light absorption sensitivity of the DSSC 900. As is understood, dye-sensitizer layer 924 enhances the photo absorption wavelength of the UV sensitive $TiO_2$ nanotubes 920.

Figure 17:
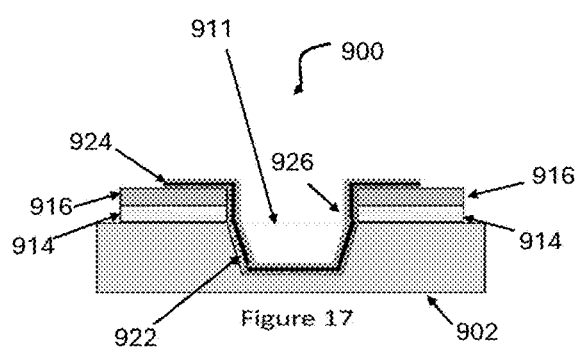
FIG. 17 depicts yet another embodiment of an alternate DSSC showing sensitized dye on a thin layer of $TiO_2$ nanotubes deposited on the silicon substrate surface, wherein the sensitized dye is conformally coated with conductive metal contact within a trapezoidal profile shape.

FIG. 17 depicts DSSC 900 including a conductive metal contact layer 926 (i.e., a FTO/ITO/conductive top contact layer) deposited overlaying sensitive dye layer 924. In one embodiment, metal contact layer 926 may be conformally deposited on dye sensitizer layer 924. In still another embodiment, metal contact layer 926 may additionally overlay an area of DSSC lying outside of the trapezoidal profile shape 911.

Figure 18:
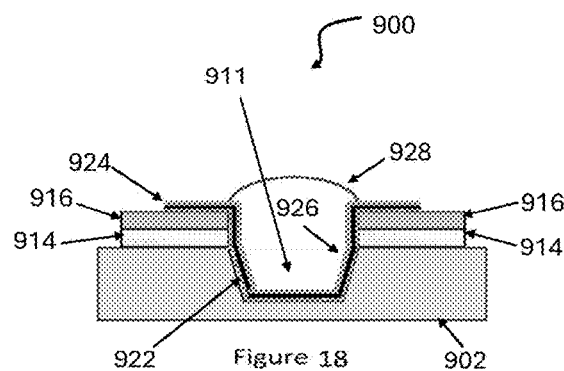
FIG. 18 is a depiction of an alternate embodiment of a surface etched DSSC photoanode according to exemplary embodiments of the present invention depicting a high-refractive index material deposited as a drop/convex lens over the well.

FIG. 18 depicts DSSC 900 including a high-refractive index material 928 deposited over trapezoidal shape profile 911. In one exemplary embodiment, high-refractive index material 928 may be deposited over trapezoidal shape profile 911 to form a convex lens over trapezoidal shape 911. By "high-refractive index" what is meant is the degree to which the incident light is bent from the lens tangential surface normal as it enters from a lower refractive medium (i.e. air) into a higher refractive medium. The higher refractive index layer slows speed at which the incident light travels, which causes a correspondingly increased change in the direction of the light within the layer. A suitable high-refractive index layer useful with this invention may bend the direction the light travels away from the normal line such that the light will slow down and change direction more as it enters the trapezoidal shape 911.

Figure 20:
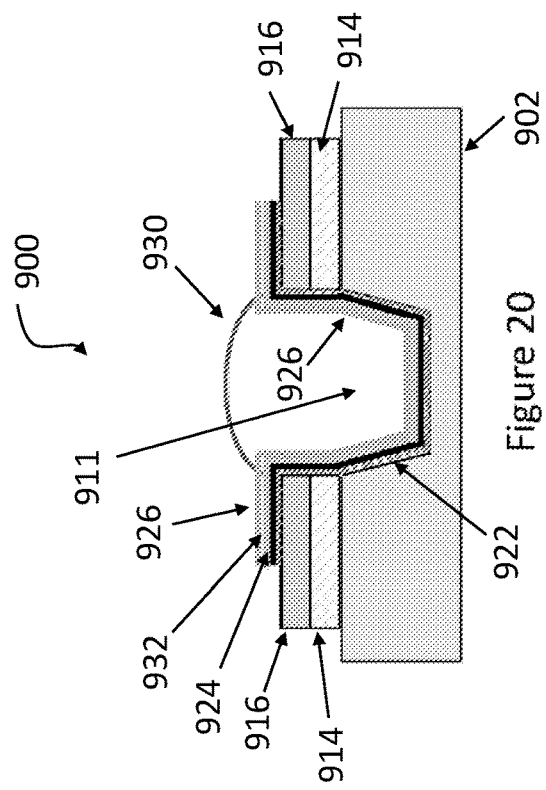
FIG. 20 is a depiction of an alternate embodiment of a surface etched DSSC photoanode according to exemplary embodiments of the present invention depicting a high-refractive index material deposited after the $Cs_2O$ film as a drop/convex lens over the well.
Figure 19:
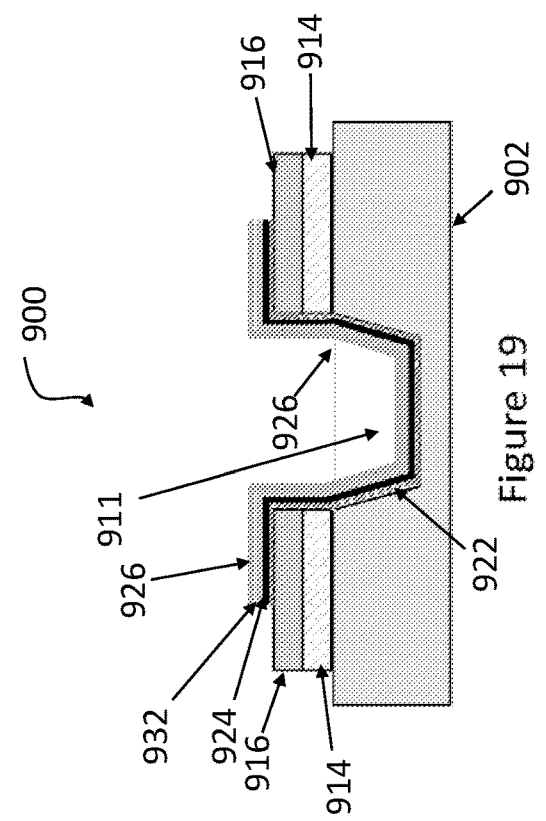
FIG. 19 is a depiction of an alternate embodiment of a surface etched DSSC photoanode according to exemplary embodiments of the present invention depicting a photoactive $Cs_2O$ film conformally coated on the sensitized dye, followed by the conductive metal contact deposited film.

In another exemplary embodiment, as shown in FIG. 19, DSSC 900 may be formed by including a photoactive film 932 overlaying dye sensitizer layer 924, and including metal contact layer 926. Photoactive film 932 may be overlaying dye sensitizer layer 924, prior to including metal contact layer 926. Suitable photoactive film 932 may include photoactive $Cs_2O$ film. In such embodiment, as shown in FIG. 20, high-refractive index material layer 930 may be deposited over trapezoidal shape profile 911 to form a convex lens over trapezoidal shape 911, in equivalent manner was described with respect to FIG. 18.

Figure 21:
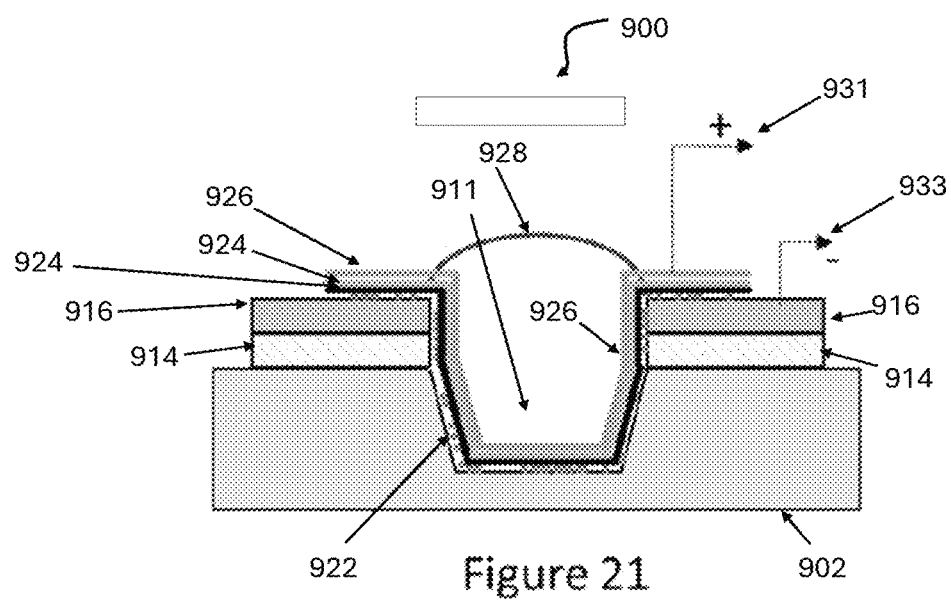
FIG. 21 is a depiction of an alternate embodiment of a surface etched DSSC photoanode according to exemplary embodiments of the present invention depicting the electrical connections made with the metal contacts.

As noted, it is an object of this invention to ensure that the DSSCs taught according to the various embodiments of this invention. For example, FIG. 21 depict DSSC 900 showing electrical connections connected to DSSC 900 for allowing electricity to be transferred from DSSC 900 to an external load. As shown, a first electrical connection 931, shown as an electrically positive connection, is in communication with metal contact layer 926. First electrical connection 931 may serve as a positive terminal for DSSC 900. A second electrical connection 933, shown as an electrically negative connection, is in communication with metal contact layer 906. Second electrical connection 933 may serve as the negative terminal to DSSC 900. In operation, a load may be connected to both first electrical connection 931 and second electrical connection 933 for receiving electricity generated by DSSC 900.

Indeed, the foregoing description has been directed to specific embodiments of this invention. However, although the invention is described having the embodiments depicted, it will be appreciated that other variations and modifications may be made to the described embodiments, with the attainment of some or all of the advantages contained therein. Therefore, it is the object of the appended claims to cover all such variations and modifications as come within the true spirit and scope of the invention.

For example, the invention contemplates the use of different metals used as metal contacts for the DSSC constructed according to the below claims. Suitable metal contacts that may be used in this invention are silver, tungsten, aluminum, and copper. The invention also contemplates transparent electrodes, as are known in the art, including transparent thin films or electrodes fabricated from organic or inorganic materials. Additionally, while the invention teaches a chromium seed layer for growing a metal contact, such as AU, the invention includes other methods of overlaying a metal contact on chromium.

The invention claimed is:
1. A photovoltaic cell including:
   a. a silicon micro-structure including trapezoidal 3D microwells;
   b. conformally-deposited anodized $TiO_2$ nanotube film deposited within the 3D microwells; and
   c. a dye-sensitizer layer deposited on the $TiO_2$ nanotube film.
2. A photovoltaic cell according to claim 1, wherein the silicon microstructure is bulk-surface etched to form the 3D dimensional microwells.
3. A photovoltaic cell according to claim 2, wherein the bulk etching results in a trapezoidal profile shaped micro-structure.
4. A photovoltaic cell according to claim 2, wherein the 3D microwells are formed using bulk micromachining photolithography.
5. A photovoltaic cell according to claim 1, further including a backside electrical contact in communication with the dye-sensitizer layer.
6. A photovoltaic cell according to claim 5, wherein the backside electrical contact is transparent electrode.
7. A photovoltaic cell according to claim 5, further including a frontside electrical contact in communication with the silicon micro-structure, the frontside electrical contact in communication with the dye sensitizer layer.
8. A photovoltaic cell according to claim 7, wherein the frontside electrical contact is one of gold or copper.
9. A photovoltaic cell according to claim 8, further including a high-refractive index material layer overlaying the 3D microwells.
10. A photovoltaic cell according to claim 8, wherein the high-refractive index material forms a convex lens over at least one of the 3D microwells.
11. A photovoltaic cell according to claim 4, further including a photoactive film overlaying the dye-sensitizer layer.
12. A photovoltaic cell according to claim 11, further including a backside electrical contact in communication with the photoactive film.
13. A photovoltaic cell according to claim 11, wherein the backside electrical contact is transparent electrode.
14. A photovoltaic cell according to claim 12, further including a frontside electrical contact in communication with the silicon micro-structure, the frontside electrical contact in communication with the dye sensitizer layer.
15. A photovoltaic cell according to claim 14, wherein the frontside electrical contact is one of gold or copper.
16. A photovoltaic cell according to claim 14, further including a high-refractive index material layer overlaying the 3D microwells.
17. A photovoltaic cell according to claim 16, wherein the high-refractive index material forms a convex lens over at least one of the 3D microwells.

* * * * *